(12) United States Patent
Stoutamire

(10) Patent No.: US 10,525,546 B2
(45) Date of Patent: Jan. 7, 2020

(54) WELDING APPARATUS HAVING A WIRE PULSER AND METHODS THEREOF

(75) Inventor: Mark Stoutamire, Cumming, GA (US)

(73) Assignee: AZZ WSI LLC, Suwanee, GA (US)

( * ) Notice: Subject to any disclaimer, the term of this patent is extended or adjusted under 35 U.S.C. 154(b) by 0 days.

(21) Appl. No.: 13/479,100

(22) Filed: May 23, 2012

(65) Prior Publication Data
US 2012/0298630 A1 Nov. 29, 2012

Related U.S. Application Data

(60) Provisional application No. 61/489,204, filed on May 23, 2011.

(51) Int. Cl.
*B23K 9/32* (2006.01)
*B23K 9/26* (2006.01)
*B23K 9/28* (2006.01)
*B23K 9/00* (2006.01)
*B23K 9/167* (2006.01)
*B23K 9/12* (2006.01)
*B23K 9/29* (2006.01)

(52) U.S. Cl.
CPC .............. *B23K 9/125* (2013.01); *B23K 9/167* (2013.01); *B23K 9/26* (2013.01); *B23K 9/28* (2013.01); *B23K 9/296* (2013.01); *B23K 9/32* (2013.01)

(58) Field of Classification Search
CPC ........ B23K 9/125; B23K 9/167; B23K 9/296; B23K 9/32; B23K 9/00; B23K 9/26; B23K 9/28
USPC .................... 219/75, 136, 56.1, 85.18, 137.7
See application file for complete search history.

(56) References Cited

U.S. PATENT DOCUMENTS

| | | | | |
|---|---|---|---|---|
| 2,005,477 A | * | 6/1935 | Schmitt | .......................... 431/147 |
| 2,731,536 A | * | 1/1956 | Laur | .......................... 219/137 R |
| 3,053,975 A | * | 9/1962 | Nelson et al. | ............. 219/137.7 |
| 3,339,057 A | | 8/1967 | Bernard et al. | |
| 4,159,410 A | | 6/1979 | Cooper | |
| 4,283,617 A | * | 8/1981 | Merrick | ............... B23K 9/0286 |
| | | | | 219/125.1 |
| 4,801,781 A | | 1/1989 | Hori et al. | |

(Continued)

FOREIGN PATENT DOCUMENTS

| | | |
|---|---|---|
| CN | 101422843 A | 5/2009 |
| CN | 103857489 B | 12/2016 |

(Continued)

OTHER PUBLICATIONS

Patent Cooperation Treaty; PCT International Search Report, Issued in Connection with International Application No. PCT/US2012/039214; dated Sep. 13, 2012; 4 pages; Europe.

(Continued)

*Primary Examiner* — Michael G Hoang
(74) *Attorney, Agent, or Firm* — Greenberg Traurig LLP

(57) ABSTRACT

A welding apparatus is provided herein. The apparatus includes a wire source having welding wire, a wire feed drive, and a wire pulser. The wire feed drive drives the welding wire from the wire source. The wire pulser has a first end associated with the wire feed drive and a second end associated with a wire conduit. The wire is fed through the wire conduit to a wire nozzle. The wire pulser increase and decrease the effective length of the wire as the wire moves through the wire conduit from the wire feed drive to the wire nozzle.

6 Claims, 5 Drawing Sheets

(56) References Cited

U.S. PATENT DOCUMENTS

| | | | |
|---|---|---|---|
| 5,499,802 A * | 3/1996 | Haberle | 269/99 |
| 6,127,651 A | 10/2000 | Burgoon et al. | |
| 6,448,531 B1 * | 9/2002 | Esslinger | B23K 9/0026 |
| | | | 219/125.11 |
| 6,610,958 B2 | 8/2003 | Stricklen | |
| 6,963,048 B2 | 11/2005 | Huismann et al. | |
| 6,969,823 B2 | 11/2005 | Huismann et al. | |
| 6,984,806 B2 | 1/2006 | Huismann et al. | |
| 7,102,099 B2 | 9/2006 | Huismann et al. | |
| 7,138,602 B2 | 11/2006 | Huismann et al. | |
| 7,351,933 B2 | 4/2008 | Huismann et al. | |
| 7,364,059 B2 | 4/2008 | Huismann et al. | |
| 7,554,056 B2 | 6/2009 | Huismann et al. | |
| 2007/0119840 A1 * | 5/2007 | Flattinger | B23K 9/1336 |
| | | | 219/137.31 |
| 2007/0256288 A1 * | 11/2007 | Vermaat | B23K 37/0531 |
| | | | 29/464 |
| 2008/0210676 A1 * | 9/2008 | Lambirth | B23K 9/10 |
| | | | 219/130.1 |
| 2008/0217313 A1 * | 9/2008 | Huismann et al. | 219/137.7 |
| 2010/0236430 A1 * | 9/2010 | Al-Awadhi | B30B 9/3057 |
| | | | 100/280 |
| 2010/0253072 A1 * | 10/2010 | Klein | F16L 33/227 |
| | | | 285/255 |

FOREIGN PATENT DOCUMENTS

| | | |
|---|---|---|
| EP | 2714318 B1 | 8/2017 |
| JP | 8309535 | 8/1996 |

OTHER PUBLICATIONS

Patent Cooperation Treaty; PCT Written Opinion of the International Searching Authority, Issued in Connection with International Application No. PCT/US2012/039214; dated Sep. 13, 2012; 6 pages; Europe.

European Patent Office; Patent Abstracts of Japan for JP08309535; Nov. 26, 1996; 1 page; Europe.

State Intellectual Property Office, P.R. China; Second Office Action, Issued in connection to CN201280036326.9; dated Feb. 26, 2016; 15 pages; China.

European Patent Office; Translation of CN101422843A; May 6, 2009; 16 pages; Europe.

Response as Filed (OA2) to the Chinese Patent Office in connection to CN103857489B; dated Jul. 2016; 11 pages; China.

Australian Government, IP Australia; Patent Examination Report No. 1, issued in connection to AU2012258800; dated Dec. 23, 2014; 3 pages; Australia.

Canadian Intellectual Property Office; Office Action issued in connection to CA2840601; dated May 25, 2018; 4 pages; Canada.

Intellectual Property India, Government of India; Examination Report, issued in connection to IN 3773/KOLNP/2013; dated Sep. 18, 2018; 5 pages; India.

Korean Intellectual Property Office; Final Notification of Provisional Rejection, issued in connection to KR10-2013-7034113; dated Mar. 19, 2019; 4 pages; Korea.

European Patent Office; Communication Pursuant to Article 94(3) EPC, issued in connection to EP12724826.8; 5 pages; Europe.

* cited by examiner

WELDING APPARATUS HAVING A WIRE PULSER AND METHODS THEREOF

CROSS-REFERENCE TO RELATED APPLICATIONS

This Non-Provisional Patent Application claims the benefit of and priority to prior Provisional Patent Application No. 61/489,204, filed on May 23, 2011.

FIELD OF THE DISCLOSURE

The present disclosure relates generally to welding apparatuses and methods thereof. In particular, the present disclosure relates to a welding apparatuses having a wire pulser with an internal slider crank for establishing an effective wire oscillation, and methods thereof.

BACKGROUND

Generally known methods of welding and cladding pressure-retaining components include Tungsten Inert Gas ("TIG") welding, also known as Gas Tungsten Arc Welding ("GTAW"). Portable GTAW systems have been used for welding pipes, vessels, valves, and other metal components in a wide range of industries including power generation (nuclear and fossil), oil and gas, chemical, petrochemical, and the like. Such portable GTAW systems were capable of deposition rates (or the rate of wire feed consumption) of about ¾ pounds per flour. Other GTAW systems (typically those including a preheated wire) were capable of deposition rates of up to about 1.2 pounds per hour. Still further prior GTAW systems (such as those that pulsed the wire) were capable of deposition rates of up to about 5 pounds per hour.

SUMMARY OF THE DISCLOSURE

In accordance with an illustrative embodiment of the disclosure illustrated herein is a welding apparatus. The apparatus may include a wire source having welding wire, a wire feed drive, and a wire pulser. The wire feed drive may drive the welding wire from the wire source. The wire pulser may have a first end associated with the wire feed drive and a second end associated with a wire conduit. The wire may be fed through the wire conduit to a wire nozzle. The wire pulser may increase and decrease the effective length of the wire as the wire moves through the wire conduit from the wire feed drive to the wire nozzle.

In accordance with a second illustrative embodiment of the disclosure illustrated herein is are methods for using the welding apparatus in welding operations.

BRIEF DESCRIPTION OF THE DRAWING FIGURES

The present disclosure will be further explained with reference to the attached drawing figures, wherein like structures are referred to by like numerals throughout the several views. The drawing figures shown are not necessarily to scale, with emphasis instead generally being placed upon illustrating the principles of the present invention.

DETAILED DESCRIPTION OF THE INVENTION

Figure 1:
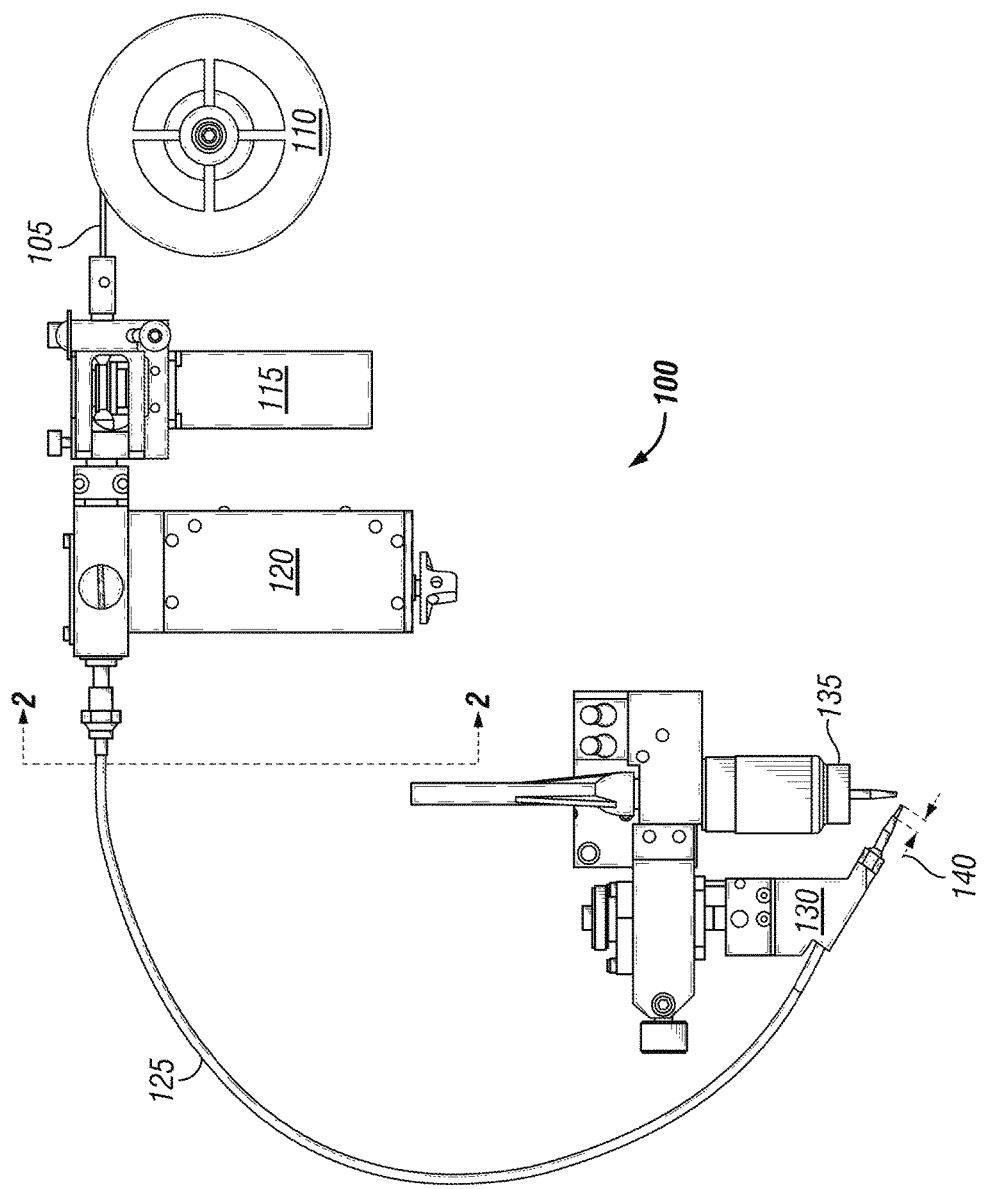
FIG. 1 is an illustrative schematic embodiment of a welding system of the present disclosure.

Detailed embodiments of the present welding apparatus and methods are disclosed herein; however, it is to be understood that the disclosed embodiments are merely illustrative of the welding apparatus and methods that may be embodied in various forms. In addition, each of the examples, if any, given in connection with the various embodiments of the welding apparatus and methods are intended to be illustrative, and not restrictive. Further, the drawing figures are not necessarily to scale, some features may be exaggerated to show details of particular components. In addition, any measurements, specifications and the like shown in the drawing figures are intended to be illustrative, and not restrictive. Therefore, specific structural and functional details disclosed herein are not to be interpreted as limiting, but merely as a representative basis for teaching one skilled in the art to variously employ the present invention.

With reference to FIG. 1, an illustrative welding apparatus 100 of the present disclosure is provided. The welding apparatus 100 may include a wire 105 that may be fed from an optional wire supply, or spool, 110, to a wire feed drive 115, and into a wire pulser 120. The wire 105 may exit the wire pulser 120 through, or to, a wire conduit 125. The wire conduit 125 may direct, or channel, the wire 105 to a nozzle manipulator 130. In an embodiment, the welding system 100 may feed the welding wire 105 at a set, programmed (preferably constant) speed, driven, actuated, or moved by the wire feed drive 115, and may direct the welding wire 105 into, or toward, a molten puddle (not shown) formed by an arc (not shown) generated by the GTAW torch 135. Oscillation, or actuation, of the wire pulser 120 may pulse the wire extension from the wire nozzle 130 an amount equal to the amplitude of oscillation 140 of the wire conduit 125.

Applicant presently believes (without wishing to be bound by the theory) that the disclosed welding apparatus 100 may provide various approaches to the oscillation of welding wire 105, other than by varying the speed at which the welding wire 105 is being fed. Exemplary approaches may include for example varying the effective length of the wire conduit 125, which connects the wire feed drive 120 to the wire nozzle 130, which is preferably affixed to, or associated with, the welding torch 135. Applicant further presently believes (without wishing to be bound by the theory) that for a constant wire feed speed, by increasing the effective length of the wire conduit 125, the velocity of the welding wire 105 may be decreased as the vector sum of the constant wire feed speed and the rate of increase in the distance traveled; and by the same token, as the effective distance is decreased, the welding wire's 105 velocity may be increased by the vector sum of the constant wire feed speed and the rate of decrease in the distance traveled. Still further, in various embodiments, the amplitude of the velocity pulse may be equal to the amplitude of the change in effective length of the wire conduit 125, and the pulse rate may be equal to the frequency of oscillation of the wire conduit 125 length.

Figure 2:
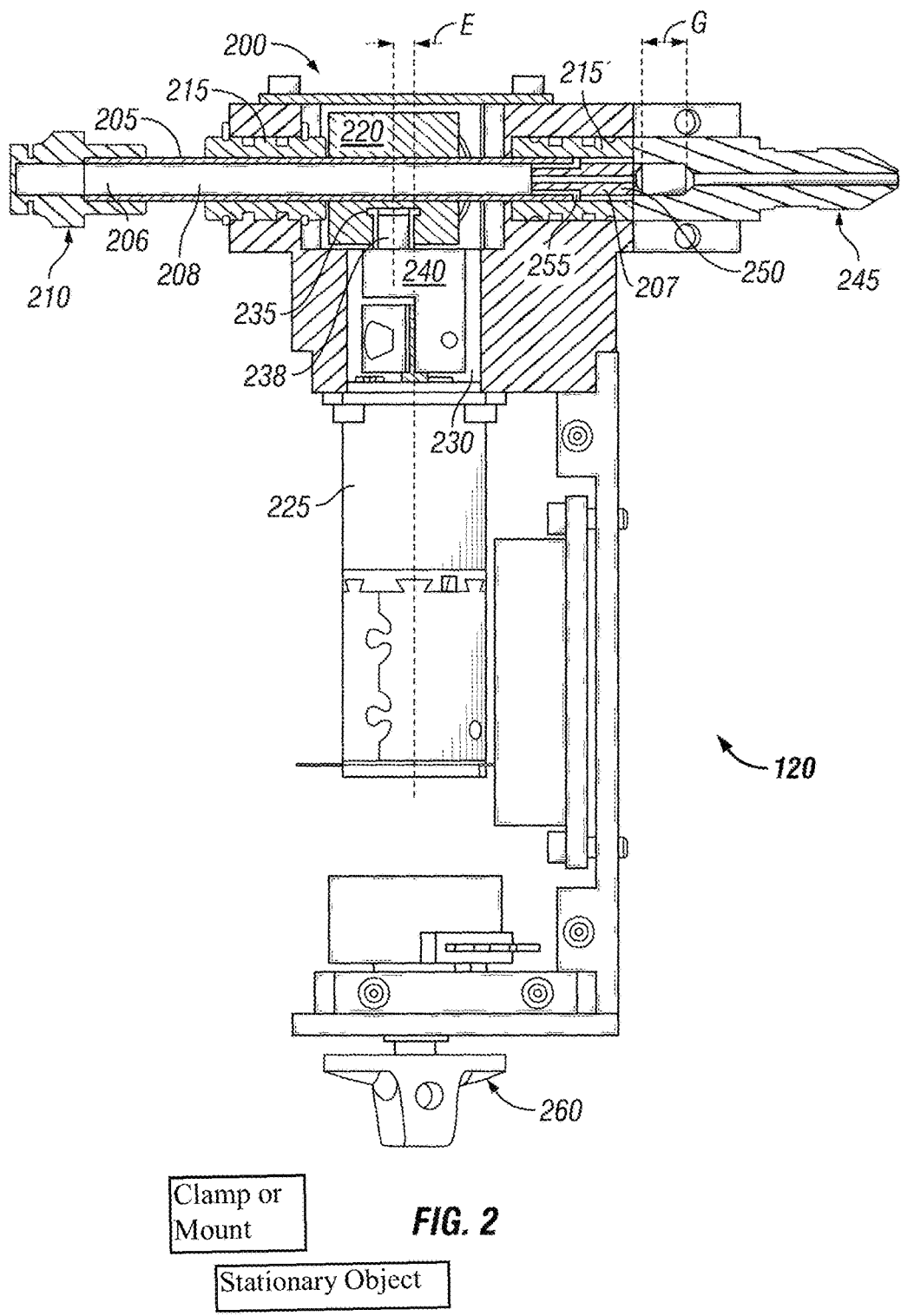
FIG. 2 is an illustrative cross-section view a wire pulser of the welding system of FIG. 1 taken across line 2-2.
Figure 3:
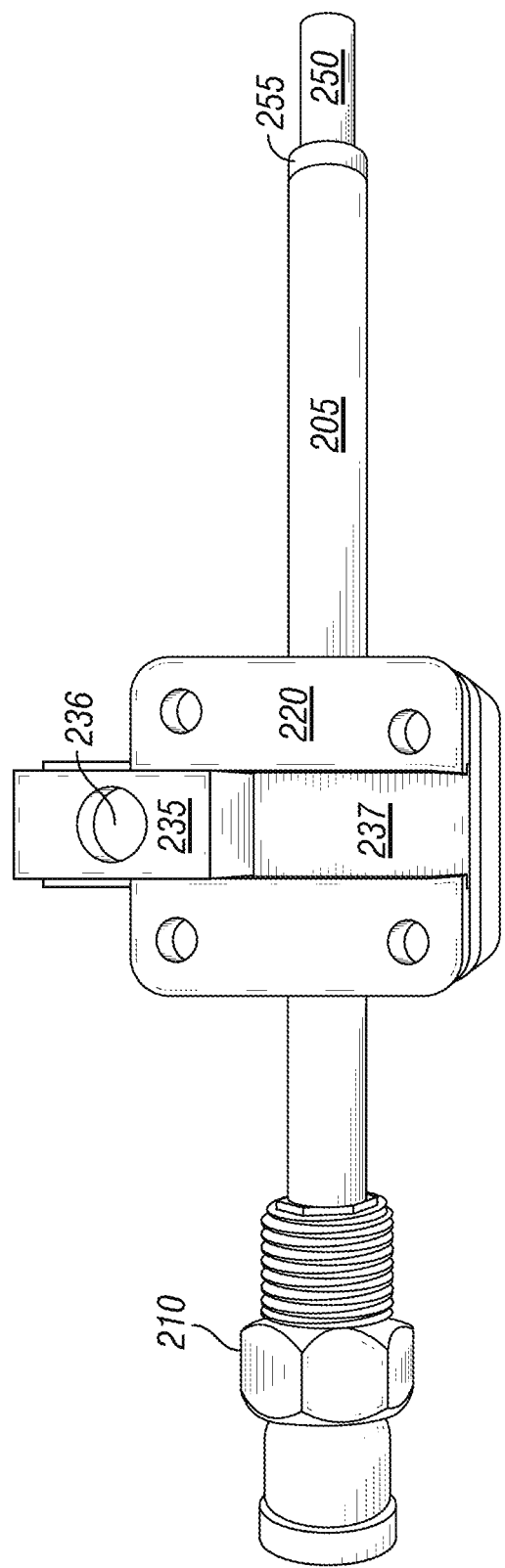
FIG. 3 is an illustrative bottom view of a tube engaged with split block and t-nut of the present disclosure.
Figure 4:
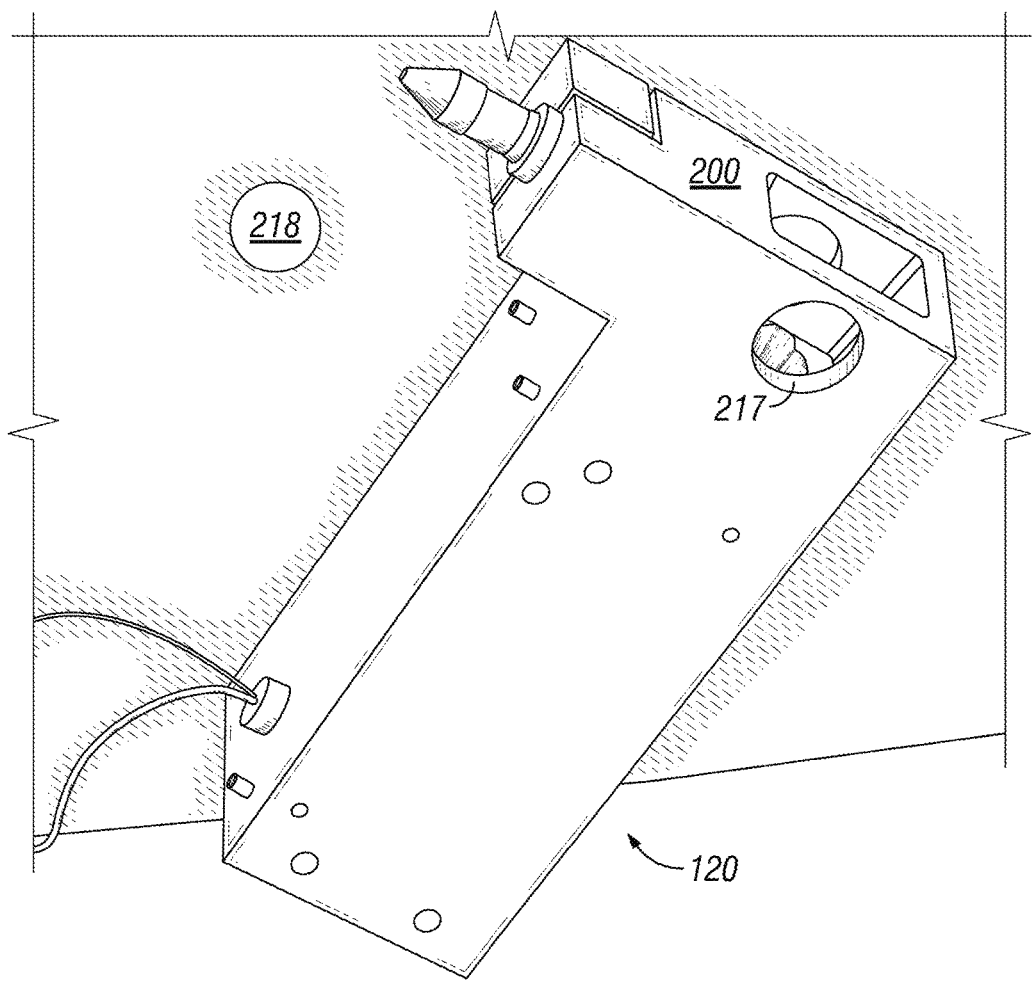
FIG. 4 is an illustrative perspective view of an alternative wire pulser of the present disclosure having the tube, split block, and t-nut of FIG. 3 removed.
Figure 5:
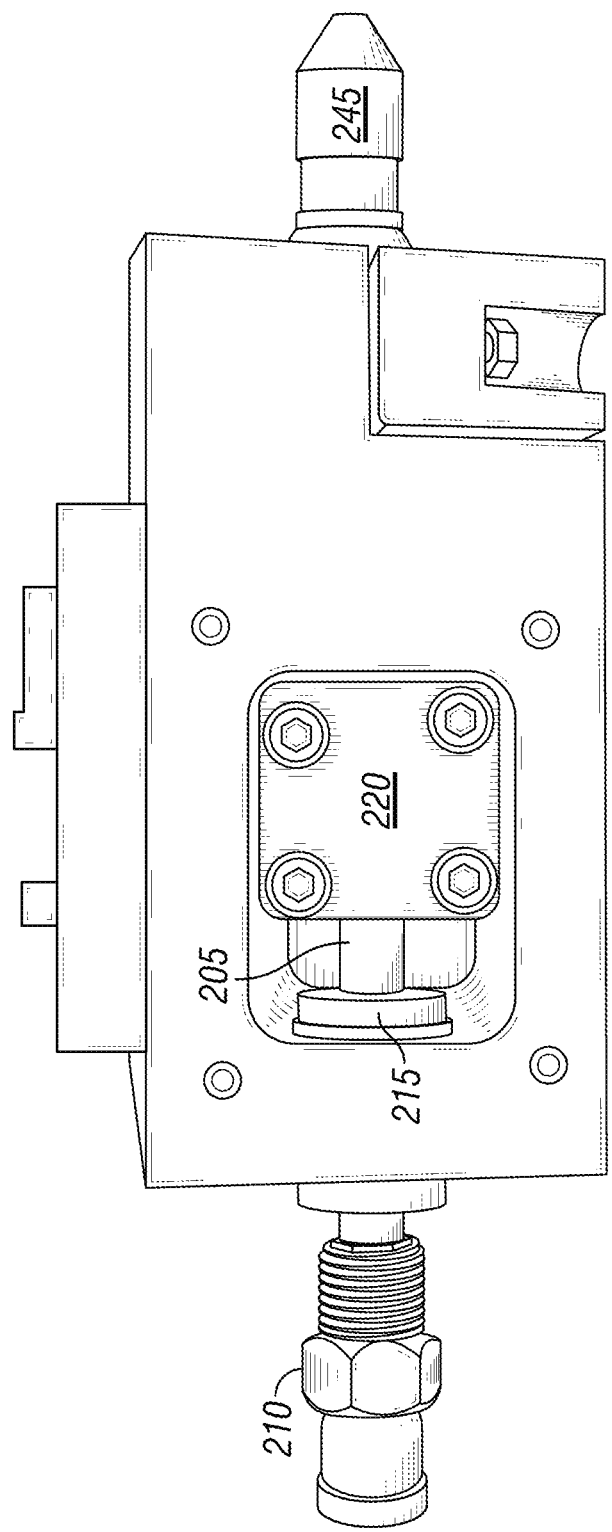
FIG. 5 is an illustrative top view of the wire pulser of FIG. 4 engaged with the tube, split block, and t-nut of FIG. 3.

With reference to FIG. 2, an illustrative embodiment of a wire pulser 120 of the present disclosure is provided. In the embodiment, the wire pulser 120 may include a housing 200 having a tube 205. The tube may have a first end 206 and a second end 207, and may be disposed within, or associated with, a bore 208 of the housing 200. The tube 205 may be formed of any material having the strength and wear-resistance suitable for use in welding applications, including without limitation ceramics, engineered plastics, and metals such as aluminum, steel, and stainless steels, for example 304 series stainless steel. The tube 205 may contain, or be associated with, a first end of the wire conduit 125 (shown in FIG. 1). The distal end of the wire conduit 125 may be connected to the wire nozzle 130 (as shown in FIG. 1). In an embodiment, disposed about, or associated with, the first end 206 of the tube 205 may be a fitting 210. In an embodiment, the fitting 210 may be a modified fitting such as a "push-to-lock" pneumatic fitting, which may serve as a "quick connect" for affixing, or associating, the wire conduit 125 within the tube 205. The tube 205 may be constrained, or otherwise substantially limited, to near linear motion by one or more bearings 215, 215'. In an embodiment, with reference to FIG. 4 the housing 200 of the wire pulser 120 includes optionally threaded ports 217, which may receive or otherwise engage or be associated with the linear cylindrical guide pads 218. The guide pads 218 are optionally threaded to reciprocate engagement, or association, with the ports 217 of the housing 200. The bearings 215 and guide pads 218 may independently be formed of any material having the strength and wear-resistance suitable for use in welding applications, including without limitation ceramics, engineered plastics, and metals such as aluminum, steel, and stainless steels. With reference to FIGS. 2-5 and in an embodiment, the tube 205, when engaged or associated with the bore 208 of the housing 200, may be constrained, or otherwise substantially limited, to near liner motion by engagement or association of the linear bearings 215, 215'. In an embodiment, rotation of the split block 220 (described below) may limited or reduced by engagement or association of the guide pads 218 with the ports 217 of the housing 200.

Between the (optionally two) bearings 215, 215' may be a split block 220, which may be clamped, for example by screws or pins, (not shown), or otherwise secured to or associated with, the tube 205. The split block 220 may be connected to a motor 225 by a slider-crank connection 230. Without limitation and in various embodiments, the motor 225 may be driven at speeds ranging from about 3 hertz to about 40 hertz, alternatively from about 5 hertz to about 20 hertz. In an embodiment, the slider-crank connection 230 may be a "pin-in-slot" connection.

In an alternative embodiment, the slider-crank connection 230 may include a nut, or a t-nut, 235 (FIGS. 2 and 3) having a t-nut bore 236 in a mating slot 237 (FIGS. 2 and 3) on the split block 220 (FIGS. 2 and 3) and a pin 238 (FIG. 2) formed integral or associated with a hub 240 (FIG. 2), which may be clamped, or otherwise secured to or associated with, the motor shaft (not shown). In an embodiment, the pin 238 (FIG. 2) formed integral or associated with the hub 240 is located eccentrically, E, from the center of the motor 225. Continuing with reference to FIG. 2, as the motor 225 drives (or rotates) the (eccentric) pin 238 of the hub 240 in a generally circular motion, the t-nut 235 in the slot 237 (FIGS. 2 and 3) on the split block 220 moves in a generally perpendicular motion to the length of the tube 205, and drives, oscillates, or otherwise moves the tube 205 forward and backward along a direction of its length (perpendicular to the motion of the t-nut 235). In an embodiment, the tube 205 drives, oscillates, or otherwise moves a distance ranging from about 0.05 inches to about 0.4 inches, alternatively at least about 0.1 inches, and alternatively at least about 0.25 inches. In an embodiment, a gap, G, may be provided between the end of the tube 220 and the bottom of a bore in the inlet adaptor 245, to accommodate, or otherwise accept, the oscillation or movement of the tube 205. In an embodiment, the inlet adaptor 245 may attached, affix, or otherwise associate the wire pulser 120 with the wire feed drive 115. In an embodiment, the movement or oscillation of the tube 205 increases and decreases the wire feed path length (by a distance ranging from about 0.05 inches to about 0.4 inches) between the wire feed drive 115 and the fixed end of the wire conduit 125 at the wire nozzle 130 where it is associated with the torch 135. In a further embodiment, the wire pulser 120 may include a clamp, mount, or hook, or stand 260 suitable for affixing the wire pulser to a stationary object such as a tube or pipe (not shown) during welding. In this manner, the welding apparatus 100 may have a wire puller 120 having a generally small size and a generally small moving mass such that it is suitable for mounting onto portable equipment for pipe welding and other GTAW processes based portable field welding systems.

In a further embodiment, the welding wire 105 may be electrically insulated from the housing 200. In an embodiment, the inlet adaptor 245 may be made from materials suitable for electrical insulation, such as without limitation, glass, ceramic, or plastic. Further, the tube 205 may terminate with (or have at its second end distal from the end with the fitting 210) an inlet wire guide portion 250, which may have a diameter less than the diameter of the main-body tube 205. In an embodiment, the inlet wire guide portion 250 is made from the same or different material as the tube 205. In an alternative embodiment, the inlet wire guide portion 250 is Made from 410 series stainless steel. In an embodiment, an insulator bushing 255 may be disposed about at least a portion of inlet wire guide portion for electrical isolation. In an embodiment, the insulator bushing 255 may be formed from materials suitable for electrical insulation, such as without limitation, glass such as G10 green glass, ceramic, or plastic. In an embodiment, electrical isolation may be preferably for hot wire processes.

Without wishing to be bound by the theory, Applicant presently believes that the instant welding apparatus and methods thereof may generally increase the deposition rate of portable GTAW welding equipment by incorporating a small mechanism capable of pulsing the filler wire at a high rate of speed; reducing the oscillating mass of the wire pulser to reduce vibrations from the wire pulser onto the portable welding equipment; electrically insulate components of the mechanism that contact the wire to allow the use of an auxiliary current to be applied to the wire to assist in pre-heating the wire prior to entry into the puddle (referred to herein as "hot wire process"); and incorporate a quick-change method of changing the wire conduit to minimize complexity and associated down time required to change the wire conduit.

Further, without wishing to be bound by the theory, Applicant presently believes that the present system and methods may increase/decrease the effective wire conduit path to create an oscillation instead of oscillating the entire wire drive mechanism or oscillating the velocity of the wire feed drive motor; the wire pulser may have a small size and small moving mass which makes it suitable for mounting onto portable equipment for pipe welding and other GTAW process based portable field welding systems; the wire pulser may incorporate a small servo control board for velocity control; pulsing frequency may be changed locally using a control potentiometer for use with systems lacking auxiliary motor control or may be fully integrated into systems possessing auxiliary motor control capability; the wire pulser may further incorporate a "push-to-loc" pneumatic fitting as a quick-connect method of affixing and retaining the wire conduit guide tube.

I claim:

1. A welding apparatus comprising:
a wire source having welding wire;
a wire feed drive for driving the welding wire from the wire source; and
a wire pulser having a first end associated with the wire feed drive and a second end associated with a wire conduit,
wherein the wire pulser comprises a slider crank,
and wherein the welding wire is fed through the wire conduit to a wire nozzle,
and wherein the welding wire moves through the wire conduit from the wire feed drive to the wire nozzle,
and wherein the housing has a first end, a second end and a bore passing therethrough along its entire length from the first end to the second end and a tube disposed within the bore, the tube having a first end adjacent the first end of the housing and a second end adjacent the second end of the housing such that the welding wire is capable of passing through the tube,
and wherein the tube is constrained within the bore by a bearing that extends outwardly from an outer wall of the housing into the bore, and contacts the surface of the tube to constrain the tube to linear motion.

2. The welding apparatus of claim 1, wherein the slider crank of the wire pulser oscillates at least a portion of the welding wire exiting the wire nozzle by a distance of between 0.1 inches to 0.25 inches toward and away from a GTAW torch.

3. The welding apparatus of claim 1, wherein the wire pulser provides harmonic oscillation of the welding wire.

4. The welding apparatus of claim 1, wherein the connection is made by one or more of a clamp, a mount and a stand.

5. The welding apparatus of claim 1, wherein the second end of the tube has a pneumatic fitting disposed thereon such that the wire conduit is capable of detachably affixing to the second end of the tube.

6. A welding apparatus comprising:
a wire source having welding wire;
a wire feed drive for driving the welding wire from the wire source; and
a wire pulser having a first end associated with the wire feed drive and a second end associated with a wire conduit,
wherein the wire pulser comprises a slider crank within a housing, the housing being detachably connectable by one or more of a clamp, a mount and a stand to a stationary object during welding, the housing having a bore passing therethrough and a tube constrained within the bore by one or more bearings, the tube having a first end adjacent the first end of the wire pulser and a second end adjacent the second end of the wire pulser such that the welding wire is capable of passing through the tube, the wire conduit being capable of detachably affixing to the second end of the tube,
and wherein the welding wire is capable of being fed through the wire conduit to a wire nozzle and the welding wire moves through the wire conduit from the wire feed drive to the wire nozzle.

* * * * *